United States Patent [19]

Otto et al.

[11] Patent Number: 4,960,335

[45] Date of Patent: Oct. 2, 1990

[54] UNITARY ENCLOSURE AND COVER THEREFOR

[75] Inventors: Dennis L. Otto, Carroll County; Richard O. Dimit, Stark County, both of Ohio

[73] Assignee: The Timken Company, Canton, Ohio

[21] Appl. No.: 434,820

[22] Filed: Nov. 13, 1989

[51] Int. Cl.[5] ............................................. F16C 33/78
[52] U.S. Cl. .................................... 384/484; 384/489; 277/32
[58] Field of Search ............... 384/484, 485, 489, 147, 384/130; 277/32, DIG. 4, 237 A

[56] References Cited

U.S. PATENT DOCUMENTS

| | | |
|---|---|---|
| 3,395,950 | 8/1968 | Brandt . |
| 3,396,975 | 8/1968 | Otto . |
| 3,628,837 | 12/1971 | Otto . |
| 3,833,277 | 9/1974 | Jones et al. . |
| 4,368,933 | 1/1983 | Motsch .................................. 384/489 |
| 4,440,401 | 4/1984 | Olschewski et al. . |
| 4,770,548 | 9/1988 | Otto ...................................... 384/478 |
| 4,832,161 | 5/1989 | Weiler et al. .................. 277/DIG. 4 |

FOREIGN PATENT DOCUMENTS 0228847 7/1987 European Pat. Off. .

Primary Examiner—Lenard A. Footland
Attorney, Agent, or Firm—Gravely, Lieder & Woodruff

[57] ABSTRACT

The interior of an antifriction bearing is isolated with an enclosure having a case which fits into the outer race of the bearing and primary and secondary lips which establish a barrier along a sealing surface that is located beyond the inner face of the bearing. The primary lip, which is presented toward the interior of the bearing, does not actually contact the sealing surface, but does have pumping cavities which direct lubricant, that migrates along the sealing surface, back toward the interior of the bearing. The secondary lip projects away from the primary lip and actually contacts the sealing surface. The case, primary lip and sealing lip are all molded from a common polymer as an integral unit. Where the journal around which the bearing fits ends beyond one end of the bearing, a polymer cover may be snapped over the enclosure at that end of the bearing to provide an extra measure of isolation.

20 Claims, 2 Drawing Sheets

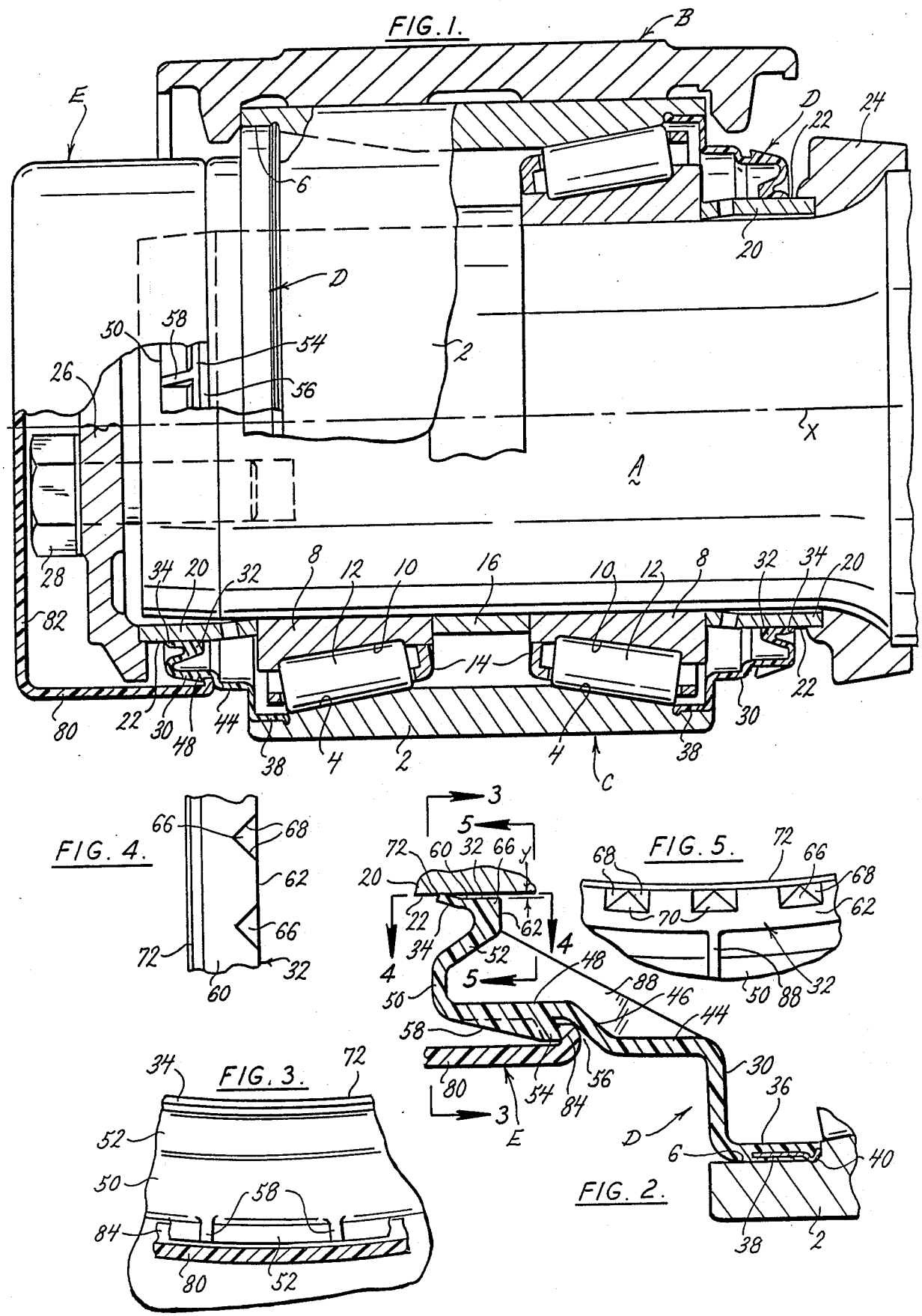

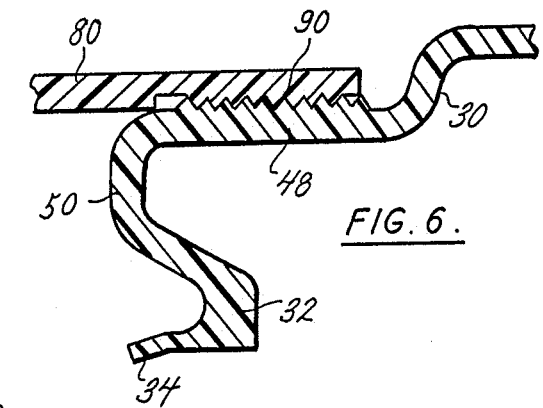
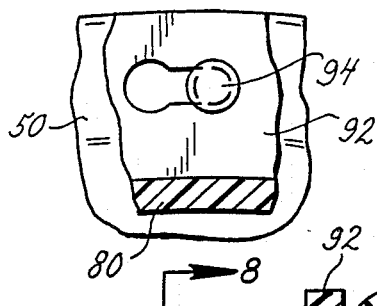
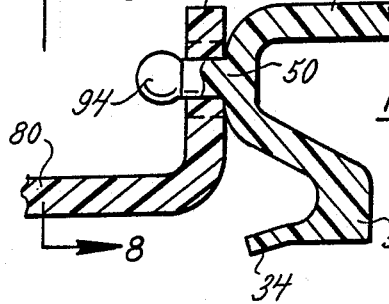
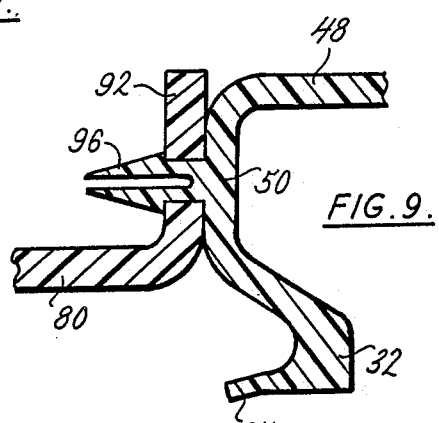
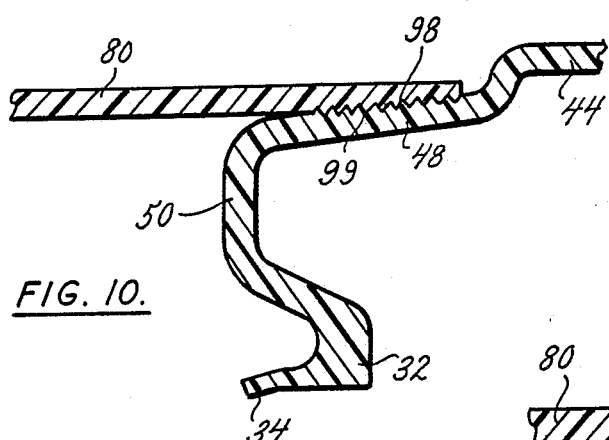
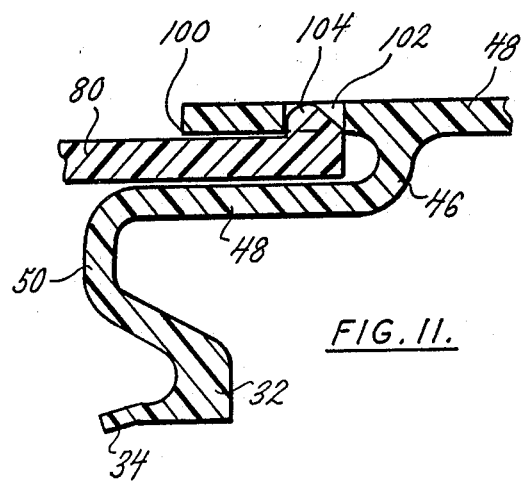

UNITARY ENCLOSURE AND COVER THEREFOR

BACKGROUND OF THE INVENTION

This invention relates in general to sealing spaces between rotating bodies and more particularly to an enclosure for establishing a barrier along a sealing surface and to a cover which cooperates with a sealing mechanism.

The journal bearings at the ends of rail car axles operate in a most hostile environment, for they move, often at high speeds, close to the road bed in an atmosphere of grit and dust. And, of course, they encounter a continuous spray of water whenever it rains. Moreover, discontinuities in the track, such as those caused by rail joints, create severe impacts which are transmitted to and through such bearings. Many of the bearings currently in use are of the antifriction variety and as such contain rollers which travel along raceways. The environment to which rail car bearings are subjected would quickly destroy such bearings were it not for the presence of seals or other barrier-forming devices at the ends of the bearings. These devices in effect isolate the interior of the bearing from the surrounding atmosphere.

The typical seal has primary and secondary lips which bear against a wear ring and establish barriers along the wear ring. Indeed, a garter spring encircles the primary lip to insure that it remains snugly around the wear ring. This type of seal requires a considerable amount of torque on the order of 38 in-lbs simply to overcome the friction between it and the wear ring, and of course torque demands power in the form of increased fuel consumption.

Some barrier arrangements dispense with lip-type seals altogether, and instead rely on steel enclosures which are press fitted to the bearing and spaced outwardly from surfaces along which they establish labyrinth-type barriers, but the barriers so established are not as effective as the contact-type of barrier created by the traditional two lip seal. On the other hand, being separated from sealing surface, a labyrinth enclosure imposes essentially no demands for torque. To provide an extra measure of protection, some labyrinth enclosures on the outboard ends of bearings may have steel covers attached to them, and these covers extend over and completely enclose the ends of their respective journals. But the covers require loose pieces in the form of nuts to secure them, and these pieces can work loose or a few may simply be left off by maintenance personnel. Furthermore, the covers and enclosures, being formed from steel, are quite heavy. As a consequence, when a bearing experiences an impact, as when the wheel for its journal rolls over a track joint, the inertial forces on the cover and enclosure may dislodge the cover and enclosure from the bearing into which the enclosure is pressed.

The present invention resides in an enclosure including a case and lips united into a single polymer molding, with the case being configured to fit to a bearing and the lips being positioned around a sealing surface to establish a barrier along the surface. A lightweight polymer cover is quickly and securely connected to the case of the enclosure.

DESCRIPTION OF THE DRAWINGS

In the accompanying drawings which form part of the specification and wherein like numerals and letters refer to like parts wherever they occur:

FIG. 1 is an elevational view, partially in section, of a bearing and journal assembly provided with a unitary enclosure and cover constructed in accordance with and embodying the present invention;

FIG. 2 is an enlarged partial sectional view of the enclosure;

FIG. 3 is a partial end view of the enclosure taken along line 3—3 of FIG. 2;

FIG. 4 is a view of the primary and secondary lips for the enclosure taken along line 4—4 of FIG. 2;

FIG. 5 is a partial end view of the enclosure taken along line 5—5 of FIG. 2;

FIG. 6 is a partial sectional view of a modified enclosure and cover joined together with screw threads;

FIG. 7 is a partial sectional view of another modified enclosure and cover joined together with bayonet fittings;

FIG. 8 is an end view of the modified enclosure and cover of FIG. 7 taken along line 8—8 of FIG. 7;

FIG. 9 is a partial sectional view of still another modified enclosure and cover held together with snap fittings;

FIG. 10 is a partial sectional view of a yet another modified enclosure and cover held together at friction surfaces; and FIG. 11 is a partial sectional view of yet another modified enclosure and cover held together at a snap-type connection.

DETAILED DESCRIPTION

Referring now to the drawings, a journal A (FIG. 1) on the end of a rail car axle projects into a housing B on a rail car truck and indeed supports the truck through a bearing C which extends around the journal A and fits into the housing B. The bearing C enables the journal A to rotate easily within the housing B about an axis x of rotation. At its inboard and outboard ends, the bearing C has enclosures D which serve to isolate the interior of the bearing B and thereby prevent contaminants from entering it. The outboard enclosure D is further fitted with a cover E which extends across the end of the journal A to thereby provide an extra measure of isolation. The enclosures D and the cover E are formed almost entirely from a lightweight, yet tough and durable, polymer.

The bearing B (FIG. 1) is conventional and may be of the type sold by The Timken Company under the trademark AP. It includes a unitary double cup 2 having a pair of inwardly presented tapered raceways 4 which taper downwardly toward the midportion of the bearing C and counterbores 6 at the large ends of the raceways 4. The counterbores 6 open out of the ends of the cup 2 and are undercut at their inner ends. The bearing C also includes a pair of cones 8 located within the cup 2, with each having an outwardly presented raceway 10 that is presented toward a raceway 4 of the cup 2. The cone raceways 10 likewise taper downwardly toward the midportion of the bearing C. In the annular space between each pair of cup and cone raceways 4 and 10 is a single row of tapered rollers 12, and the rollers 12 of these rows are properly spaced by cages 14 which further serve to hold the rollers 12 around their respective cones 8 when the cones 8 are withdrawn from the cup 2. The setting for the bearing C is established by a spacer 16 which fits within the midportion of the cup 2 between the ends of the two cones 8. The cup 2 fits within the housing B—indeed, between shoulders at the ends of the housing B—while the two cones 8 and the spacer 16 fit snugly over the journal A.

The two cones 8 actually fit between a pair of wear rings 20 which likewise encircle the journal A. Each has an outwardly presented sealing surface 22 of cylindrical configuration. The inboard wear ring 20 in turn bears against a filet ring 24 that fits around and against a filet at the inboard end of the journal A. The outboard wear ring 20, on the other hand, extends out to an end cap 26 which extends across the end face of the journal A and is held against the journal A by cap screws 28 which thread axially into the journal A. Indeed, the cap screws 28, when turned down against the end cap 26, cause the end cap 26 to clamp the two cones 8 and the intermediate spacer 16, as well as the two wear rings 20, snugly between it and the filet ring 24. The arrangement allows the journal A to rotate freely within the housing B about the axis of the journal which is, of course, the axis x of rotation for the bearing C.

The enclosures D project from the ends of the double cup 2, to which they are securely fitted, and encircle the wear rings 20 located beyond the ends of the bearing C, where they establish barriers to the ingress of contaminants into the interior of the bearing C, that is into the annular space between the raceways 4 and 10. Each enclosure D includes a case 30, a primary lip 32 and a secondary lip 34 all united into a single polymer molding. The polymer should be tough and durable. It should further possess some resiliency to accommodate a limited amount of flexure in the secondary lip 34 and in the greatest diameter of the case 30, yet it should have sufficient rigidity to retain its shape under the demand of operation. Glass reinforced nylon is a suitable polymer for the enclosures D.

The case 30 (FIG. 2) includes an axially directed mounting flange 36 that fits into the counterbore 6 at one end of the double cup 2, it being about the same length as the counterbore 6, yet is slightly larger in diameter than the counterbore 6. Embedded within flange 36 is a steel retaining ring 38 having a locking bead 40 which projects out of the polymer to fit into the undercut at the end of the counterbore 6. This retains the flange 36 in the counterbore 6. Moreover, the fit between the flange 36 and the cup 2 at the counterbore 6 is such that a static seal exists between the case 30 and cup 2 at this location, and that seal, of course, excludes contaminants from the interior of the bearing C.

The mounting flange 36 at its end remote from the bead 40 merges into a radial wall 42 which extends inwardly, indeed, beyond the shoulders at the end of the housing B. At its inner margin the radial wall 42 merges into an axial wall 44 which lies parallel to the axis x. The axial wall 44 merges into an oblique wall 46 which in turn merges into another axial wall 48 that likewise lies parallel to the axis x, but is of lesser diameter than the wall 44. ALL three walls 44, 46 and 48 encircle the wear ring 20. The lesser axial wall 48 merges into a radially directed end wall 50 which in turn merges into an oblique connecting wall 52 that turns under the lesser axial wall 48 where it serves as a mount for the primary lip 32 and secondary lip 34.

In addition, the case 30 has a locking ring 54 which is formed integral with and projects outwardly from the lesser axial wall 48. The ring 54 is spaced from the oblique wall 46, yet is inclined slightly toward it, so that a groove 56 exists between the ring 54 and wall 46, and this groove is relatively shallow inasmuch as the radial projection of the ring 54 is somewhat less than that of the oblique wall 46. Leading up to the ring 54 are ramp-like webs 58 (FIGS. 2 and 3) which are arranged at equal circumferential intervals around the axial wall 48. Indeed, each web 58 rises out of the outside corner formed by the merger of the axial wall 48 and end wall 50 and terminates at the outer surface or edge of the locking ring 54. As such, the outwardly presented edge of each web 58 forms a ramp which leads from the end wall 50 to the outer edge of the ring 54.

The primary lip 32 encircles the sealing surface 22 of the wear ring 20, and although it effectively establishes a barrier to the migration of lubricant along the sealing surface 22, it does not actually contact the sealing surface 22. Instead, the oblique connecting wall 52 of the case 30 supports the primary lip 32 concentrically with respect to the wear ring 20. In this regard, the connecting wall 52 flares outwardly and in effect merges with the primary lip 32 which is somewhat thicker, the two being formed integral with each other.

The primary lip 32 includes (FIGS. 2, 4 and 5) a circumferential face 60 which is presented inwardly toward the axis x and lies parallel to that axis as well as to the sealing surface 22 on the wear ring 20. However, the diameter of the circumferential face 60 is slightly greater than the diameter of the sealing surface 22 so that a clearance y (FIG. 2) exists between the two. The clearance y should range between 0.002 and 0.044 inches on an average, but of course will vary because it is virtually impossible to position the primary lip 32 perfectly concentric with respect to the wear ring 20. In addition, the primary lip 32 has an end face 62 which is presented inwardly toward the interior of the bearing C. The end face 62 meets the circumferential face 60 at a relatively sharp corner which forms the inner margin of the face. The outer portion of the end face 62 merges into the oblique connecting wall 52 of the case 30. The end face 62 lies at a steep angle with respect to the sealing surface 22 and is preferably perpendicular to that surface and the axis x.

The primary lip 32 contains pumping cavities 66 (FIGS. 2, 4 and 5) which open out of the circumferential face 60 and the end face 62 and as such interrupt the edge at which those faces meet. The cavities 66 are spaced at equal circumferential intervals and are configured to direct lubricant, which migrates along the sealing surface 22 and encounters the cavities 66, back toward the interior of the bearing C, irrespective of the direction of relative rotation between the lip 32 and ring 20. In other words, the cavities 66 convert the primary lip 32 into a pump which forces the fluent lubricant for the bearing C away from the lip 32. To this end, each pumping cavity 66 has a pair of side walls 68 (FIGS. 4 and 5) which diverge from a common point toward the end face 62, thereby imparting a wedge-shaped configuration to the cavity 66. The side walls 68 intersect the end face 62 along generally radial lines and the circumferential face 60 along diverging lines. Each cavity 66 also has an outer wall 70 which flares outwardly from the common point at which the two side walls 68 meet and intersect the end face 62 along a generally circumferential line. Bearing lubricant which migrates along the sealing surface of the wear ring 20 will, by reason of centrifugal forces generated in the clearance y, encounter the pumping cavities 66, and this holds particularly true where the wear ring 20 rotates and the enclosure D remains stationary as on rail car journals. Upon entering a pumping cavity 66, the lubricant will encounter one of the diverging side walls 68, and since each of these walls is located at an angle with respect to the circumferential face 60, which is the direction of relative rotation, the lubricant will be deflected back toward the interior of the bearing C. The centrifugal forces may be so great as to fling the lubricant against the outer wall 70 of the cavity 66, and should that occur, the outer wall 70, being at an angle with respect to the axis x, will likewise direct the lubricant back toward the interior of the bearing C.

The secondary lip 34 projects generally axially from the primary lip 32 and likewise away from the interior of the bearing C. Whereas, the pumping cavities 66 open out of one end of the primary lip 32, the secondary lip 34 projects from the other end. Actually, the secondary lip 34 merges with both the primary lip 32 and the oblique connecting wall 52 of the case 30, forming a gentle curve and groove with the latter. Near its free end the secondary lip 34 turns inwardly toward the axis x and terminates at a sealing edge 72 which bears against the sealing surface 22 of the wear ring 20. Indeed, as manufactured, the secondary lip 34 along its sealing edge 62 has a diameter slightly less than the diameter of the sealing surface 22, so as to effect an interference fit between the two.

The secondary lip 34 establishes a physical barrier along the sealing surface 22 and thus prevents contaminants from entering the interior of the bearing C. Since the secondary lip 34 actually contacts the sealing surface 22, some friction does occur between the two, but this friction is certainly less than that imposed by the dust lip of a conventional seal, much less the additional friction generated along the spring loaded primary lip of such a seal. In this regard, the secondary lip 34 is not totally isolated from the supply of lubricant within the interior of the bearing C, because it is exposed to the interior of the bearing C through the clearance y along the primary lip 32. A small amount of lubricant will flow through the clearance y, primarily when the bearing C is at rest, and this lubricant serves to reduce the frictional drag imposed by the secondary lip 34 when the bearing C is in operation. In contrast, the dust lips of conventional two lip seals often run dry. Aside from the foregoing, the secondary lip 34, being formed from a polymer, does not possess a high coefficient of friction, as do elastomers, and furthermore, the polymer, not being as resilient as an elastomer, will wear away to assume a close, yet low friction, fit with the wear ring 20.

To impart better wear characteristics to the secondary lip 34, an insert of wear resistant material, such as polyfluorocarbon, may be embedded into the lip 34 during the molding of the enclosure D. The insert would be located so that the sealing edge 72 lies along it.

The cover E couples to the outboard enclosure D and projects axially from the case 30 of that enclosure D as an apparent extension of its axial wall 44 (FIG. 1). As such, it encloses the end cap 26 and the bolts 28 which secure the end cap 26 to the journal A. The cover E is molded from a tough and durable polymer such as polycarbonate. Preferably, the polymer is transparent so the end cap 26 and the heads of the cap screws 28 may be observed through it.

More specifically, the cover E is formed in a cup-shaped configuration, it having a generally cylindrical side wall 80 and an end wall 82 attached to one end of the side wall 80. The diameter of the side wall 80 is essentially the same as that of the greater axial wall 44 of the case 30 (FIG. 2), and as such the side wall 80 itself is large enough to fit over the lesser axial wall 48 and even over the locking ring 54 on that wall. However, at its open end, the wall 80 is provided with a rib in the form of a reverse curl 84 which turns inwardly toward the center of the cover E and is also inclined backwardly toward the end wall 82 at an oblique angle that matches the inclination of the locking ring 54 on the lesser axial wall 48. Moreover, the curl 84 is about as wide as the groove 56 between the ring 54 and the oblique wall 46 of the case 30.

The cover E is not installed with the enclosure D, which is usually supplied with the bearing C. On the contrary, it is attached to the enclosure D only after the bearing C together with the wear rings 20, filet ring 24 and end cap 26 are fitted to the journal A and the cap screws 28 are turned down to clamp the bearing C and wear rings 20 snugly between the filet ring 24 and end cap 26.

To install the cover E, one aligns its side wall 80 generally with the greater axial wall 44 of the case 30 on the outboard enclosure D, with the open end of the cover E of course being presented toward the enclosure D. The reverse curl 84 at the end of the side wall 80 is brought against the inclined webs 58 that lead up to the locking ring 54, whereupon an axial force is applied to the cover E along the periphery of its end wall 82 so that the force is transmitted through the side wall 80 to the curl 84. The force is of sufficient magnitude to drive the curl 84 over the inclined surfaces of the webs 58, whereupon the curl 84 and end of the wall 80 expand slightly. The curl 84 passes over the locking ring 54 and snaps into the groove 56, thus securing the cover E to the outboard enclosure D. The side wall 80 of the cover E, being about the same diameter as the greater axial wall 44 of the case 30 for the outboard enclosure D, causes the cover E to appear as an axial extension of the axial wall 44.

In operation, the journal A rotates within the housing B. The cones 8 of the bearing C, being clamped on the journal A, rotate with the journal A, and the same holds true with regard to the wear rings 20. The double cup 2 of the bearing C remains with the housing B and therefore does not rotate. Being fitted to the ends of the cup 2, the two enclosures D likewise do not rotate.

The enclosures D close the two ends of the bearing C so as to isolate the interior of the bearing C from the surrounding atmosphere. Along the mounting flanges 36 of their cases 30, they establish static seals with the double cup 2. Along their primary and secondary lips 32 and 34, they establish live or dynamic barriers with the wear rings 20. At each primary lip 32, the pumping cavities 66 divert lubricant, that might otherwise migrate along the wear ring 20, back toward the interior of the bearing C. Being separated from the wear ring 20 for all intents and purposes, the primary lips 32 produce little if any drag, that is they do not contribute to the torque required to rotate the journal A. While the secondary lips 34 along their sealing edges 72 actually contact the sealing surfaces 22 of the wear rings 20 to exclude contaminants from the interior of the bearing C, they contribute little to the torque required to rotate the journal A, because they contact the sealing surfaces 22 with a relatively light force and the sealing surfaces 22 are well lubricated at the sealing edges 72 for the lips 34. Indeed, the secondary lips 34 tend to wear away during the initial hours of operations, and shortly its sealing edges 72 acquire a diameter that is essentially the same as that of the sealing surfaces 22. The cover E protects the lips 32 and 34 of the outboard enclosure D and provides an extra measure of isolation at the outboard end of the bearing C.

Being molded from a polymer, the enclosures D and the cover E are light in weight. They are thus not as adversely affected by inertial forces, and certainly not to the extent experienced by steel labyrinth enclosures and covers. The polymer possesses better damping characteristics as well.

When sufficient clearance exists at the ends of the bearing C, the cases 30 of the enclosures D may be rigidified by several webs or gussets 88 (FIG. 2) which are located at equal circumferential intervals around the interiors of the cases 30. Each gusset 88 extends from the region where the oblique connecting wall 52 of its case merges into the primary lip 32 to the region where the radial wall 42 merges into the greater axial wall 44. In between those two locations it is attached to the greater and lesser axial walls 44 and 48, the oblique wall 46, the end wall 50, and the oblique connecting wall 52, all for the full extent of those walls.

Mechanisms other than the reverse curl 84 and inclined rib 54 may be used to secure the cover E to the outboard enclosure D. For example, the enclosure D and cover E may be provided with mating threads 90 that permit the latter to thread over the former (FIG. 6). Or the cover E may be provided with a flange 92 which accommodates a bayonet-type fitting 94 (FIGS. 7 and 8). The flange 92 may also accommodate a variety of snap fitting 96 molded into the enclosure D (FIG. 9). On the other hand, the lesser axial wall 48 may be inclined slightly with respect to the axis x and provided with a high friction exterior surface 98 which mates with another high friction surface 99 on the inside of the side wall for the cover E (FIG. 10). Both friction surfaces 98 and 99 taper slightly. Also, the enclosure D may be configured to provide an axially opening groove 100 which receives the end of the side wall 80 for the cover E, with the enclosure D having in this region apertures 102 for receiving lugs 104 on the side wall 80 of the cover E (FIG. 11).

This invention is intended to cover all changes and modifications of the example of the invention herein chosen for purposes of the disclosure which do not constitute departures from the spirit and scope of the invention.

What is claimed is:

1. In combination with an outer body and an inner body that is located within the outer body such that an annular space exists between the two bodies, one of the bodies being rotatable with respect to the other body about an axis of rotation and the inner body having an annular sealing surface that is presented away from the axes of rotation; an improved enclosure for establishing a barrier between the outer and inner bodies and thereby enclosing the annular space between the two bodies, said enclosure being formed essentially as an integral unit from a polymer and comprising: a case attached to the outer body such that a static seal exists between the case and outer body, a primary lip carried by the case and encircling the sealing surface, but being spaced from the sealing surface so that a slight clearance exists between the sealing surface and the primary lip, the primary lip having cavities which open toward the sealing surface and toward the annular space and are configured to direct lubricant which they encounter back toward the annular space.

2. The combination according to claim 1 wherein the enclosure further comprises a secondary lip which is carried by the case and projects generally away from the primary lip and enclosed space and contacts the sealing surface.

3. The combination according to claim 2 wherein the primary lip has a circumferential face which is presented toward, yet is spaced from, the sealing surface and an end face which is oriented at a substantial angle with respect to the sealing surface and is presented toward the enclosed space; wherein the circumferential and end faces meet at an edge, and wherein the pumping cavities open out of the circumferential and end faces and interrupt the edge between those faces.

4. The combination according to claim 1 wherein the outer body has a bore and the case of the enclosure has a flange which fits into the bore, with the static seal being along the flange; and wherein the case is stepped downwardly from the flange to the primary lip.

5. The combination according to claim 1 wherein the case and primary lip are molded from the same polymer.

6. The combination according to claim 1 and further comprising a cover attached to the enclosure and extending across and enclosing the ends of the sealing surface and the end of the inner body.

7. The combination according to claim 6 wherein the cover has a circumferentially extending side wall and an end wall connected to one end of the side wall; and wherein the case of the enclosure has an axially directed wall over which the side wall of the cover fits.

8. The combination according to claim 7 further comprising means for forming an outwardly opening groove on the axially directed wall of the case; and wherein the side wall of the cover has an inwardly directed rib which projects into the groove.

9. The combination according to claim 6 wherein the cover is transparent.

10. The combination according to claim 1 wherein the enclosure is made from glass reinforced nylon.

11. An enclosure for establishing a barrier along a sealing surface that extends around an axis of rotation, said enclosure comprising: a case having a connecting wall which encircles the axis of rotation and extends inwardly toward it; a primary lip connected to the case and having a circumferential surface that is presented toward the axis of rotation and an end face which is presented at a substantial angle with respect to the axis and meets the circumferential face at a corner, the primary lip further having wedge-shaped cavities opening out of its circumferential and end faces so as to interrupt the corner between the two faces; and a secondary lip projecting generally axially from the primary lip in the direction opposite from that in which the cavities open out of the end face, the secondary lip having a sealing edge that is adapted to contact a sealing surface and has a diameter less than the diameter of the circumferential face on the primary lip; the case, primary lip and secondary lip being molded from a polymer essentially as an integral unit.

12. The enclosure according to claim 11 wherein the case has an axially directed flange which is configured to fit into a bore and forms the greatest diameter of the case and at least one axially directed wall located intermediate the flange and the connecting wall.

13. The enclosure according to claim 12 and further comprising a locking ring projecting radially outwardly from the axially directed wall to form a groove along that wall and ramps located on the axially directed wall where they lead up to the outer surface of the ring.

14. In combination with the enclosure of claim 13, a cover having an axially directed wall and an end wall connected to one end of the axially directed wall so that the cover has a cup-shaped configuration, the cover further having an inwardly directed rib at the opposite end of its side wall, with the rib having a diameter slightly less than the diameter of the ring on the axially directed wall of the enclosure case, the side wall of the cover encircling the axially directed wall of the enclosure case and having its rib snapped into the groove of the enclosure case so that the cover projects axially from the case.

15. In combination with the enclosure of claim 11, a cover having an axially directed wall and an end wall attached to and extended across one end of the axially directed wall, the cover at the opposite end of its axially directed wall being attached to the case of the enclosure so that the cover encloses the secondary lip.

16. In combination with a bearing having an outer race provided with an inwardly presented raceway and a bore at one end of the raceway, an inner race having an outwardly presented raceway, and rolling elements located in an annular space between the raceways of the two races, whereby one race can rotate relative to the other race about an axis of rotation, and with a sealing surface located beyond the inner race; an improved enclosure for isolating the annular space between the raceways of the outer and inner races, said enclosure comprising: a case having an axially directed flange which fits snugly into the bore of the outer race for the bearing to establish a static seal with the outer race, and further having a connecting wall which is directed inwardly toward the sealing surface; a primary lip attached to and carried by the connecting wall of the case, the primary lip having a circumferential surface which is presented toward, yet spaced slightly from, the sealing surface at the end of the inner race and an end face which is located at a substantial angle with respect to the sealing surface and is presented toward the inner race and the annular space between the raceways, the primary lip further having wedge-shaped cavities which open out of the circumferential face and the end face and are oriented such as to pump a fluent lubricant toward the inner race; and a secondary lip carried by the connecting wall of the case and extended generally axially along the sealing surface away from the primary lip and having a sealing edge which contacts the sealing surface; the case, primary lip and the secondary lip being molded from a polymer essentially as an integral unit.

17. The combination according to claim 16 wherein the case has an axially directed wall located intermediate its connecting wall and flange, and further comprising a cup-shaped cover having an axially directed side wall that fits around the axially directed wall of the enclosure case and means for connecting the side wall of the cover to the case so as to enclose the lips and the sealing surface.

18. The combination comprising: an enclosure for closing a space between two bodies, one of which rotates relative to the other about an axes of rotation, the enclosure including a case and at least one lip, the case having means for attaching the case to one of the bodies and at least one axially directed wall, the lip being capable of establishing a barrier along a sealing surface on the other body; a cover having an axially directed wall, the cover being closed at one end of the axially directed wall and open at the other end, the axially directed wall at the open end of the cover being fitted over the axially directed wall of the enclosure case; and connecting means for securing the cover to the case of the enclosure.

19. The combination according to claim 18 wherein the connecting means comprises a groove in one of the axially directed walls and a rib on the other axially directed wall, with the rib being extended into the groove.

20. The combination according to claim 18 wherein the enclosure case has an oblique wall leading up to its axially directed wall and a locking ring attached to its axially directed wall and projecting outwardly so that the groove lies between the ring and the oblique wall; and wherein the rib is on the axially directed wall of the cover.

* * * * *